(12) United States Patent
Babin et al.

(10) Patent No.: US 7,456,629 B2
(45) Date of Patent: Nov. 25, 2008

(54) ROTARY ANGLE SENSING SYSTEM

(75) Inventors: Brian G. Babin, Bristol, IN (US);
Gregg Christensen, Newport News, VA (US); Charles Spellman, Yorktown, VA (US)

(73) Assignee: Continental Automotive Systems US, Inc., Auburn Hills ( * ) Notice: Subject to any disclaimer, the term of this patent is extended or adjusted under 35 U.S.C. 154(b) by 55 days.

(21) Appl. No.: 11/484,275

(22) Filed: Jul. 11, 2006

(65) Prior Publication Data
US 2008/0012554 A1    Jan. 17, 2008

(51) Int. Cl.
*G01B 7/30* (2006.01)
*G01R 33/07* (2006.01)
*G01R 33/09* (2006.01)
*H01L 43/06* (2006.01)
*H01L 43/08* (2006.01)

(52) U.S. Cl. .................................. 324/207.25

(58) Field of Classification Search ............ 324/207.13, 324/207.2, 207.21–207.25; 33/1 PT
See application file for complete search history.

(56) References Cited

U.S. PATENT DOCUMENTS

| | | | | |
|---|---|---|---|---|
| 2,483,359 | A * | 9/1949 | Bliss ....................... | 235/139 R |
| 4,746,859 | A * | 5/1988 | Malik ..................... | 324/207.12 |
| 4,752,732 | A * | 6/1988 | Van Schoiack et al. . | 324/207.18 |
| 5,263,258 | A * | 11/1993 | Dobler et al. ................. | 33/1 N |
| 5,481,188 | A * | 1/1996 | Mizutani ............... | 324/207.25 |
| 5,521,495 | A * | 5/1996 | Takahashi et al. ...... | 324/207.18 |
| 5,900,930 | A * | 5/1999 | Simon et al. ................. | 356/138 |
| 5,903,205 | A | 5/1999 | Goto et al. | |
| 6,034,624 | A | 3/2000 | Goto et al. | |
| 6,084,400 | A * | 7/2000 | Steinich et al. ......... | 324/207.13 |
| 6,275,025 | B1 * | 8/2001 | Wiese ...................... | 324/207.2 |
| 6,466,889 | B1 | 10/2002 | Schodlbauer | |
| 6,484,120 | B1 | 11/2002 | Goto et al. | |
| 6,512,366 | B2 * | 1/2003 | Siess ...................... | 324/207.25 |
| 6,552,666 | B1 | 4/2003 | Goto et al. | |
| 6,566,862 | B1 | 5/2003 | Goto et al. | |
| 6,571,194 | B2 | 5/2003 | Goto et al. | |
| 6,577,121 | B1 | 6/2003 | Adelerhof et al. | |
| 6,581,479 | B2 | 6/2003 | Goto et al. | |
| 6,618,688 | B2 | 9/2003 | Schödlbauer | |

(Continued)

FOREIGN PATENT DOCUMENTS

DE          004307544 A1 *  9/1994   ............ 324/207.25

(Continued)

OTHER PUBLICATIONS

International Search Report and Written Opinion dated Mar. 11, 2008 for PCT/US07/015459.*

(Continued)

*Primary Examiner*—Kenneth J Whittington (57) ABSTRACT

The present invention includes a rotary sensing system that includes a shaft, a magnet encircling the shaft, a pair of plates, each of which is positioned near distal ends of the magnet, and at least one sensing device. The magnet generates a magnetic field, the angle of which changes as the shaft rotates. The pair of plates directs the magnetic field generated by the magnet towards the at least one sensing device. The at least one sensing device is sensitive to the changes in the angle of the magnetic field, which are indicative of an angular position of the shaft.

18 Claims, 5 Drawing Sheets

U.S. PATENT DOCUMENTS

2006/0028203 A1 * 2/2006 Kawashima et al. ... 324/207.25

FOREIGN PATENT DOCUMENTS

| DE | 19753779 | | 6/1996 |
| DE | 19753779 | * | 6/1999 |
| EP | 0645605 | * | 3/1995 |
| EP | 0 795 738 | | 10/2001 |
| EP | 1 037 017 | | 12/2003 |

OTHER PUBLICATIONS

International Search Report and Written Opinion dated Mar. 11, 2008.

* cited by examiner

ROTARY ANGLE SENSING SYSTEM

BACKGROUND OF THE INVENTION

The present invention relates generally to a rotary angle sensing system, and more particularly to a sensing system that senses an angular position of a rotating shaft that reduces mechanical error, is economical to manufacture, and which can be extended to accommodate multiple rotation measurements.

One known example angular sensing system includes a non-contacting sensor element and an intervening mechanism between a shaft of interest and the non-contacting sensor element. An angular position of a rotating shaft is indirectly measured. A rotating shaft includes a gear that turns at least one additional shaft, the angular position of which is directly measured by the non-contacting sensor. The angular position of the rotating shaft is subsequently calculated based upon the direct measurement and the relationship between the measured shaft and the rotating shaft. Mechanical error, such as gear backlash, inherent in the addition of the intervening mechanism, appears in the indirect measurement of the angular position of the rotating shaft.

Another known example angular sensing system eliminates the intervening mechanism. This example system incorporates a pair of magnets to measure the angular position of the rotating shaft, whereas other angular sensing systems require only one magnet. As such, this example system is more expensive and complex to manufacture.

Further, known systems can only measure a relative angular position of a rotating shaft up to 360°. Known systems are unable to take into account that the rotating shaft may have completed, for example, two full 360° rotations prior to reaching its current angular position of 60°, and, as such, would have an actual angular position of 780°, i.e. [(2 revolutions)(360°)]+60°=780°.

Accordingly, there is a need for rotary angle sensing system that reduces mechanical error, is economical to manufacture and which provides multiple rotation measurement.

SUMMARY OF THE INVENTION

The present invention includes a rotary sensing system that includes a shaft, a magnet encircling the shaft, a pair of plates, each of which is positioned near distal ends of the magnet, and at least one sensing device. The magnet generates a magnetic field, the angle of which changes as the shaft rotates. The pair of plates directs the magnetic field generated by the magnet towards the at least one sensing device. The at least one sensing device is sensitive to the changes in the angle of the magnetic field, which are indicative of an angular position of the shaft.

For applications in which the shaft is required to rotate less than 180°, one sensing device is sufficient. However, for applications in which the shaft is required to rotate up to 360°, a second sensing device is included to unambiguously measure the angular position of the shaft.

For applications in which the shaft is required to rotate beyond one full 360° revolution, a counting mechanism is included. The counting mechanism includes a modified plate and a Geneva gear that converts the continuous motion of the rotating shaft into precise intermittent motion by indexing the Geneva gear in a known manner to count each 360° revolution of the shaft.

These and other features of the present invention can be best understood from the following specification and drawings, the following of which is a brief description.

DETAILED DESCRIPTION OF THE PREFERRED EMBODIMENT

Figure 1:
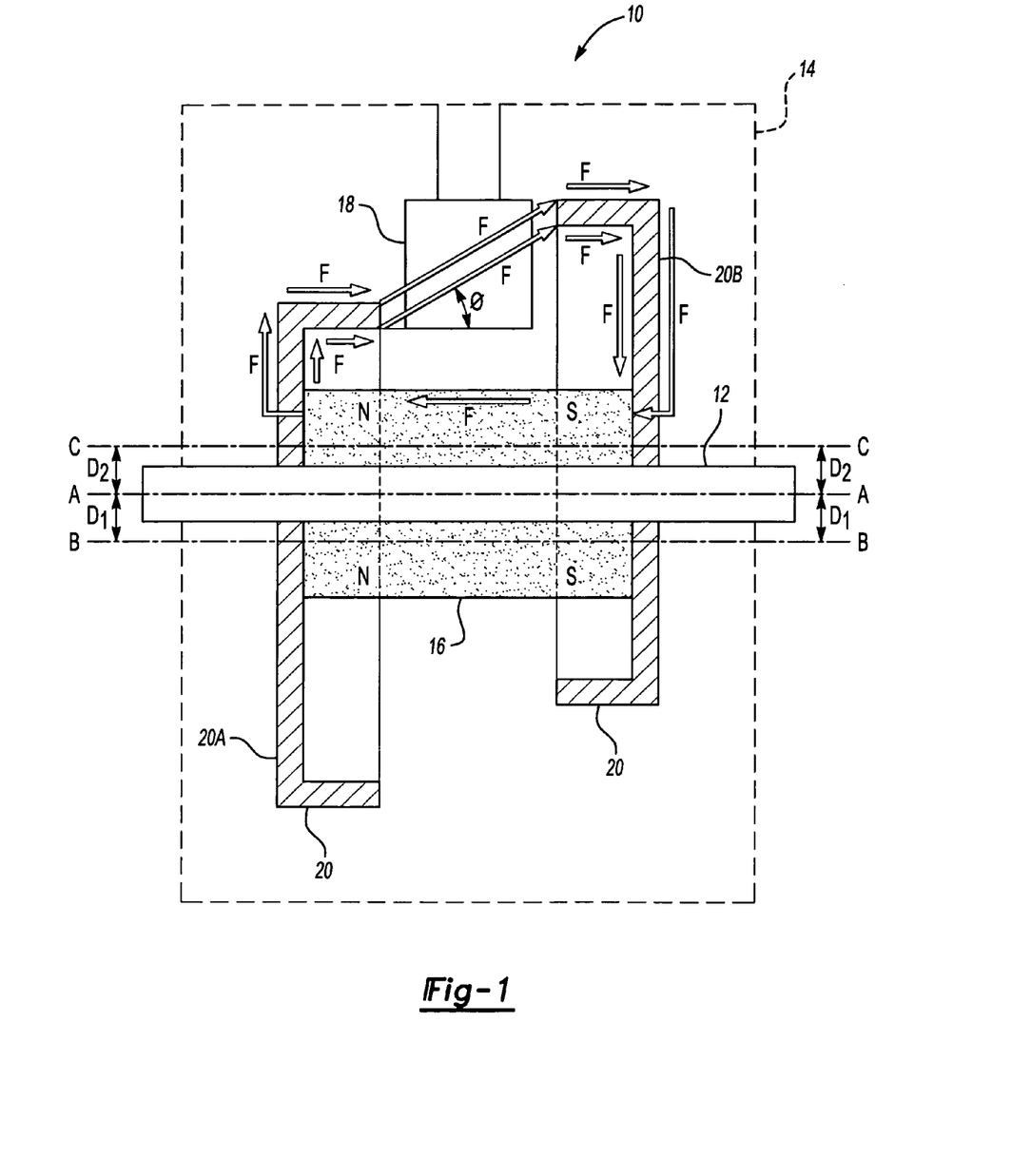
FIG. 1 is an illustration of an example embodiment of a rotary sensing system of the present invention.

FIG. 1 is an illustration of an example embodiment of a rotary sensing system 10 of the present invention. A rotating shaft 12 defines a shaft axis A-A and extends through a housing 14. An annular magnet 16 encircles the rotating shaft 12 and generates a magnetic field F. A pair of plates 20 directs the magnetic field F towards a first sensing device 18 which is mounted to the housing 14 between the pair of plates 20. The first sensing device 18 is a sensor that is sensitive to angular changes in the magnetic field F, which may include but is not limited to a magneto-resistive sensor, a magneto-inductive sensor, or a linear hall-effect sensor.

The pair of plates 20 includes a first plate 20A and a second plate 20B eccentrically mounted to the rotating shaft 12, each of which is installed at opposing distal ends of the annular magnet 16. The first plate 20A defines a first axis B-B that extends through a center point of the first plate 20A. The second plate defines a second axis C-C that extends through a center point of the second plate 20B. The rotating shaft 12 intersects each of the pair of plates 20 at an off-center position such that axis A-A is offset from axis B-B a distance $D_1$ and axis A-A is offset from axis C-C by a distance $D_2$ which is substantially equal to distance $D_1$.

The pair of plates 20 directs the magnetic field F generated by the annular magnet 16 to a desired position about the first sensing device 18. That is, the magnetic field F is generated by the annular magnet 16 and travels from S to N. The first plate 20A directs the field generated by the annular magnet 16 toward the first sensing device 18 located between the first plate 20A and the second plate 20B. As the rotating shaft 12 rotates, an angle Ø, sensed by the first sensing device 18 and associated with the magnetic field F, changes. The changes in the angle Ø associated with the magnetic field F are measured by the first sensing device 18 and are indicative of an angular position of the rotating shaft 12.

In the example embodiment illustrated, the pair of plates 20 are circular ferrous plates. It should be noted however that the pair of plates 20 are not limited to circular ferrous plates and may be manufactured from different materials or in different shapes to accommodate different applications.

Figures 2A, 2B, 2C:
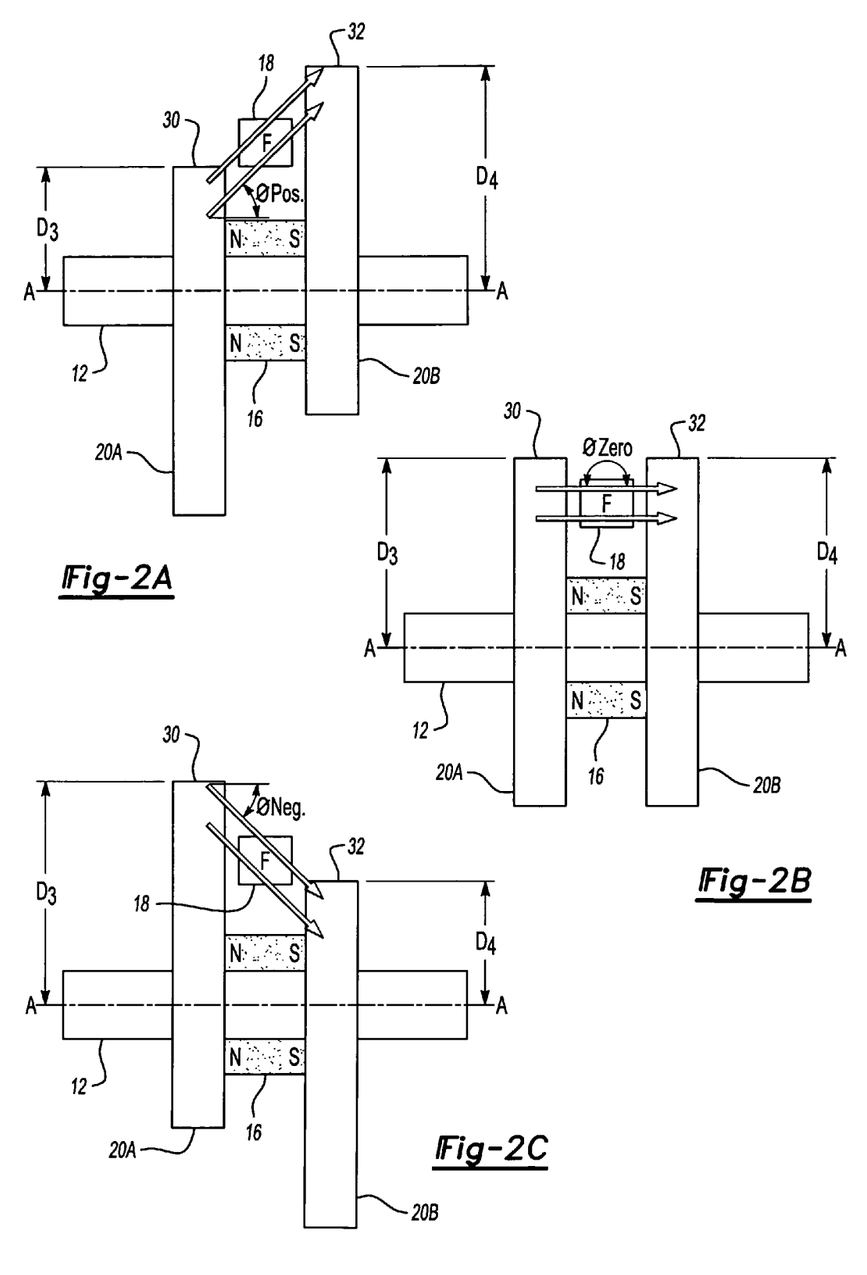
FIG. 2A is an illustration of an example embodiment of a rotary sensing system of the present invention at a maximum positive angle measurement.
FIG. 2B is an illustration of an example embodiment of a rotary sensing system of the present invention at a zero angle measurement.
FIG. 2C is an illustration of an example embodiment of a rotary sensing system of the present invention at a maximum negative angle measurement.

FIG. 2A is an illustration of one example embodiment of an example sensing device 10 in a home position at a maximum positive angle measurement Øpos. The first plate 20A and the second plate 20B are eccentrically mounted to the rotating shaft 12. The angle Ø is defined relative to the axis A-A of the rotating shaft 12 from an edge 30 of the first plate 20A to an edge 32 of the second plate 20B. When the rotating shaft 12, the annular magnet 16 and the pair of plates 20 are in the home position, the angular position is 0°, which is considered the maximum positive angle measurement Øpos. In the home position, an edge 30 of the first plate 20A is a distance $D_3$ away from the shaft axis A-A, an edge 32 of the second plate 20B is a distance $D_4$, and the distance $D_3$ is less than the distance $D_4$.

FIG. 2B is an illustration of an example embodiment of the sensing device 10 of the present invention at a zero angle measurement Øzero. Rotation of the rotating shaft 12, the annular magnet 16 and the pair of plates 20 to 90° from the home position results in the zero angle measurement Øzero. At the zero angle measurement Øzero, the rotating shaft 12 is rotated to a position in which the edge 30 of the first plate 20A is a distance $D_3$ away from the shaft axis A-A, the edge 32 of the second plate 20B is a distance $D_4$, and the distance $D_3$ is equal to the distance $D_4$.

FIG. 2C is an illustration of the sensing device 10 at a maximum negative angle measurement Øneg. Continued rotation of the rotating shaft 12, the annular magnet 16 and the pair of plates 20 to 180° from the home position results in the maximum negative angle measurement Øneg. At the maximum negative angle measurement Øneg, the rotating shaft 12 is rotated to a position in which the edge 30 of the first plate 20A is a distance $D_3$ away from the shaft axis A-A, the edge 32 of the second plate 20B is a distance $D_4$, and the distance $D_3$ is greater than the distance $D_4$.

For applications requiring angular rotational measurement less than 180°, the single sensing device 18 is sufficient. However, continued rotation of the rotating shaft 12, the annular magnet 16 and the pair of plates 20 beyond 180°, for example, to 270° from the home position results in the zero angle measurement Øzero shown in FIG. 2B. Therefore, to unambiguously measure angular rotation greater than 180°, a second sensing device 50 (shown in FIG. 5) is mounted to the housing 14 at a substantial angle, typically at least 90°, from the first sensing device 18 and a known relationship between the sensing devices is used to determine the angular position of the rotating shaft 12.

The addition of the second sensing device 50 (shown in FIG. 5) to the sensing system 10 increases the measurement capability of the sensing system 10 only to 360°. Therefore, for applications requiring angular rotational measurement beyond 360° or one full revolution, a counting mechanism (shown in FIGS. 3, 4, 5 and 5A) is utilized to extend the measurement range to accommodate multiple rotation applications.

Figure 3:
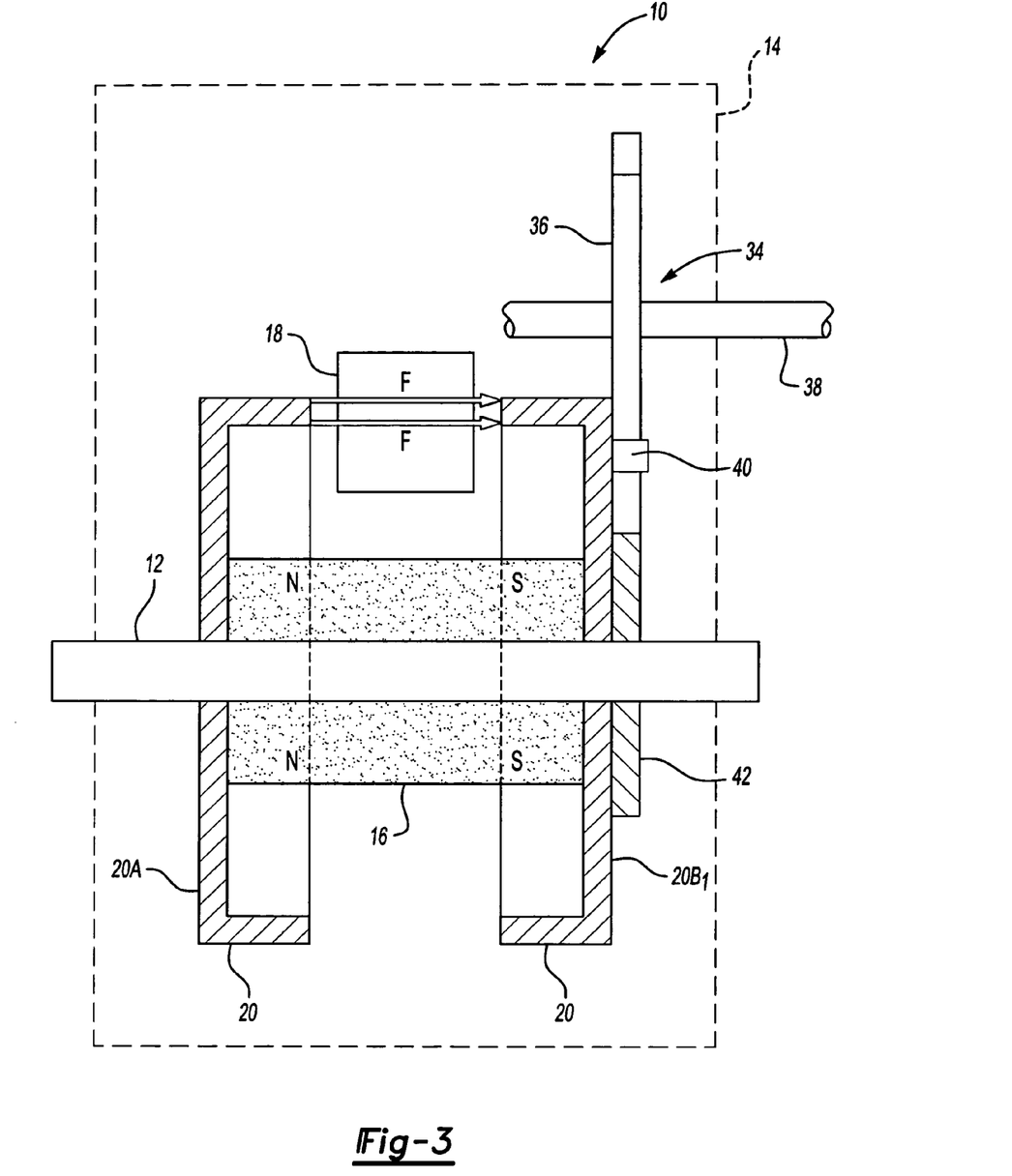
FIG. 3 is an illustration of an example embodiment of a rotary sensing system of the present invention including a counting mechanism.

FIG. 3 is an illustration of an example embodiment of a rotary sensing system 10 of the present invention including a counting mechanism 34 that converts continuous motion, i.e. the rotation of the rotating shaft 12, into precise intermittent motion, i.e. indexing that counts each 360° rotation of the rotating shaft 12. The counting mechanism 34 includes a modified second plate $20B_1$ and a Geneva gear 36 mounted on a counting shaft 38. The modified second plate $20B_1$ includes a dwell feature 42 and an indexing pin 40. As the rotating shaft 12, the annular magnet 16 and the pair of plates 20, including the modified second plate $20B_1$, rotates, the indexing pin 40 engages a slot 44 (shown in FIG. 4) in the Geneva gear 36 and indexes the Geneva gear 36 one station (shown in FIG. 4) for each 360° revolution of the rotating shaft 12. A third sensing device 52 (shown in FIG. 5) is positioned within the housing 14 proximate to the counting mechanism 34 and senses the indexing of the Geneva gear 36. Because typical steering systems require between three to four 360° revolutions of the rotating shaft 12, the indexing of the Geneva gear 36 sensed by the third sensing device 52 (shown in FIG. 5) is useful to determine an actual angular position of the rotating shaft 12 when the rotating shaft 12 rotates beyond one 360° revolution.

Figure 4:
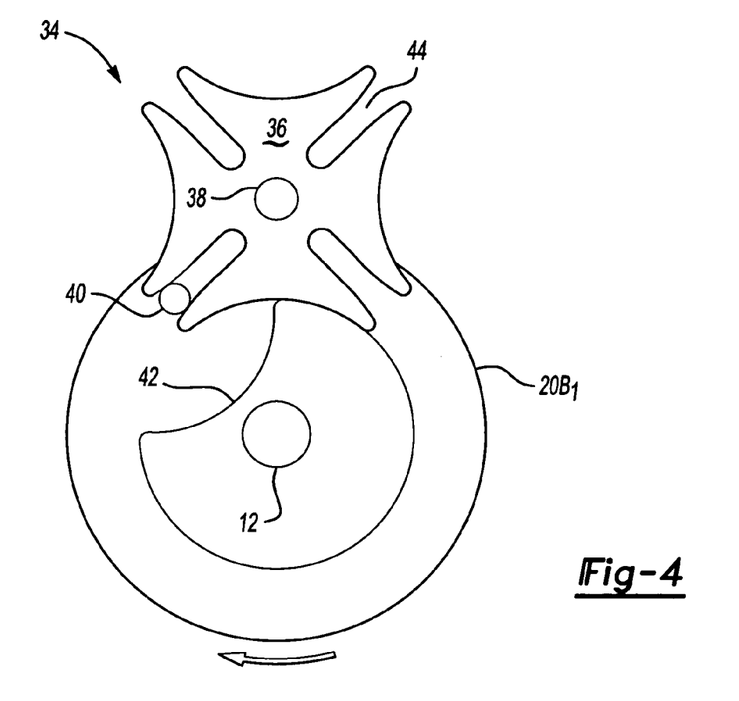
FIG. 4 is a detailed illustration of the counting mechanism of FIG. 3.

FIG. 4 is a detailed illustration of the counting mechanism 34 illustrated in FIG. 3. In the illustrated example, the Geneva gear 36 includes four (4) slots 44; however, the number of slots 44 could vary based upon the application. Each slot 44 represents a station. As such, the example Geneva gear 36 includes four consecutive stations. The Geneva gear 36 is indexed one time for each 360° revolution of the rotating shaft 12 and the third sensing device 52 (shown in FIG. 5) senses the indexing of the Geneva gear 36. As the modified second plate $20B_1$ rotates clockwise with the rotating shaft 12, the indexing pin 40 engages each slot 44 consecutively, mechanically indexing the Geneva gear 36 to each of the four consecutive stations in a known manner.

In the illustrated embodiment, the indexing pin 40 and the dwell feature 42 are integral to the modified second plate $20B_1$ to simplify manufacture.

Figure 5:
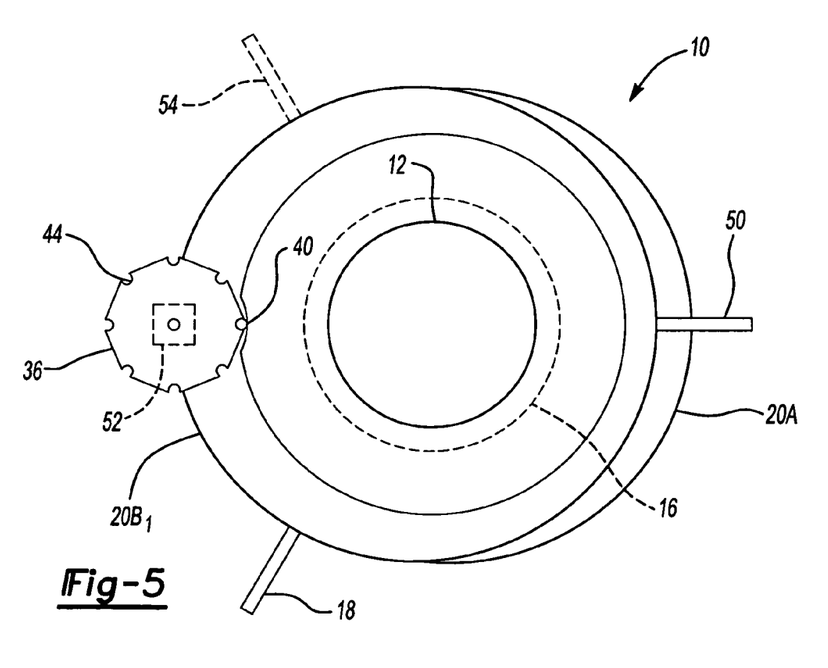
FIG. 5 is an example embodiment of a rotary sensing system of the present invention including a counting mechanism and circular plates.

FIG. 5 is an illustration of an example embodiment of a rotary sensing system 10 of the present invention including the counting mechanism 34 wherein the first plate 20A and the modified second plate $20B_1$ are circular. The first sensing device 18 and the second sensing device 50 are positioned proximate to the first plate 20A and the modified second plate $20B_1$. The first sensing device 18 and the second sensing device 50 sense angular changes in the magnetic field generated by the annular magnet 16 as discussed above.

The Geneva gear 36, in this example, includes eight slots 44, each representing a consecutive station, which interact with the indexing pin 40 located on a modified second plate $20B_1$ to index the Geneva gear 36 with each 360° rotation of the rotating shaft 12. A third sensing device 52 is positioned proximate the Geneva gear 36 senses the indexing of the Geneva gear 36.

Alternatively, a third sensing device, schematically shown as 54, may be added to satisfy the system redundancy requirements or to improve the accuracy of the rotary sensing system 10. In this configuration, the first sensing device 18, the second sensing device 50 and the third sensing device 54 are positioned approximately 120° apart from one another. Further, it should be noted that additional sensors (not shown) may also be added to further improve system accuracy.

The angular changes in the magnetic field sensed by the first sensing device 18 and the second sensing device 50 are used to determine the angular position of the rotating shaft 12 as discussed above. Further, the indexing of the Geneva gear 36 sensed by the third sensing device 52 is used to determine the number of 360° rotations of the rotating shaft 12. As such, by combining the information determined from the sensing devices 18, 50 and 52, one can determine the angular position of the rotating shaft 12 through multiple rotations.

Figure 5A:
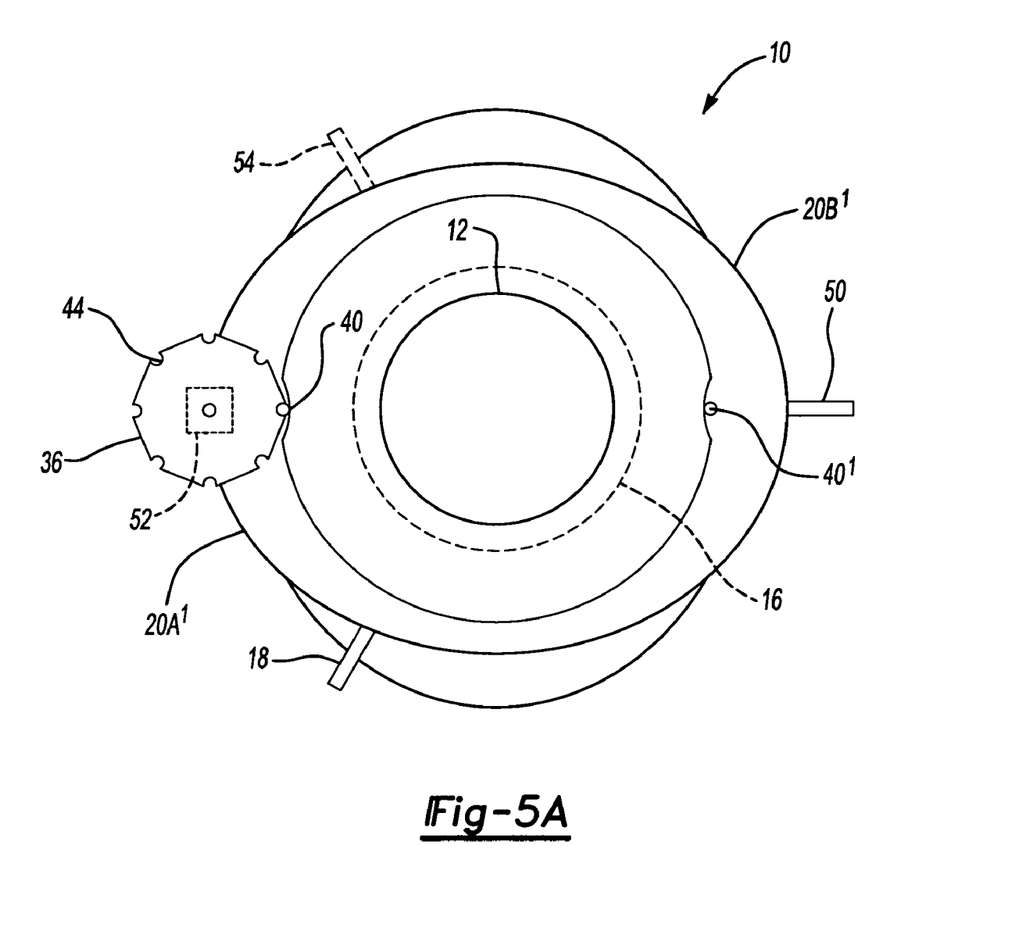
FIG. 5A is an example embodiment of a rotary sensing system of the present invention including a counting mechanism and non-circular plates.

FIG. 5A is an illustration of another example embodiment of a rotary sensing system 10 of the present invention including the counting mechanism 34, and a first plate $20A^1$ and a modified second plate $20B^1$. In this example, the first plate $20A^1$ and the modified second plate $20B^1$ are non-circular and a second indexing pin $40^1$ is added to accommodate for the non-circular geometry. The indexing pin 40 and the second indexing pin 40¹ both are located on the modified second plate 20B¹.

The first sensing device 18 and the second sensing device 50 are positioned proximate to the first plate 20A and the modified second plate 20B¹. The first sensing device 18 and the second sensing device 50 sense angular changes in the magnetic field generated by the annular magnet 16 as discussed above.

The Geneva gear 36, in this example, includes eight slots 44, each representing a consecutive station, which interact with the indexing pin 40 and the second indexing pin 40¹. The indexing pin 40 and the second indexing pin 40¹ index the Geneva gear 36 twice with each 360° rotation of the rotating shaft 12. A third sensing device 52 is positioned proximate the Geneva gear 36 senses the indexing of the Geneva gear 36.

The angular changes in the magnetic field sensed by the first sensing device 18 and the second sensing device 50 are used to determine the angular position of the rotating shaft 12 as discussed above. Further, the indexing of the Geneva gear 36 sensed by the third sensing device 52 is used to determine the number of 360° rotations of the rotating shaft 12. As such, by combining the information determined from the sensing devices 18, 50 and 52, one can determine the angular position of the rotating shaft 12 through multiple rotations.

Although preferred embodiments of this invention have been disclosed, a worker of ordinary skill in this art would recognize that certain modifications would come within the scope of this invention. For that reason, the following claims should be studied to determine the true scope and content of this invention.

What is claimed is:

1. A rotary angle sensing system comprising:
   a shaft rotatable about an axis of rotation;
   a magnet encircling and mounted to the shaft for generating a magnetic field;
   a pair of plates eccentrically mounted to the shaft, wherein each of the pair of plates is attached at distal ends of the magnet for directing the magnetic field and each of the pair of plates have a substantially circular shape, wherein an air gap is defined between the pair of plates; and
   at least one sensing device positioned in the air gap between the pair of plates for detecting the magnetic field directed through the air gap defined between the pair of plates.

2. The rotary angle sensing system as recited in claim 1, wherein the shaft defines a first axis and each of the pair of plates defines a plane transverse to the first axis.

3. The rotary angle sensing system as recited in claim 2, wherein the shaft intersects each of the pair of plates at an off-center position.

4. The rotary angle sensing system as recited in claim 3, wherein the magnet extends along the first axis from a first position proximate to one of the pair of plates to a second position proximate to the other of the pair of plates.

5. The rotary angle sensing system as recited in claim 1, wherein the pair of plates directs the magnetic field at an angle that changes as the shaft rotates and the at least one sensing device is sensitive to the changes in the angle of the magnetic field.

6. The rotary angle sensing system as recited in claim 5, wherein the angle of the magnetic field is indicative of an angular position of the shaft.

7. The rotary sensing system as recited in claim 1, wherein the at least one sensing device includes a first sensing device and a second sensing device.

8. The rotary sensing system as recited in claim 7, wherein the first sensing device is located at a first position between the pair of plates and the second sensing device is at a second position between the pair of plates.

9. The rotary sensing system as recited in claim 1, further including a counting mechanism.

10. The rotary sensing system as recited in claim 9, wherein the counting mechanism comprises:
    a driven wheel driven by a counting shaft, and including a locking radius and a cut out for receiving a pin;
    a driver wheel driven by the shaft, and including the pin; and
    a counting sensor.

11. The rotary sensing system as recited in claim 10, wherein the driven wheel indexes from one station to a subsequent station with each 360 degree revolution of the wheel driver which coincides with a 360 degree rotation of the shaft.

12. The rotary sensing system as recited in claim 11, wherein the counting sensor generates a count signal indicating completion of each 360 degree revolution of the driver wheel.

13. The system as recited in claim 1, wherein the magnetic field directed through the air gap includes an angle relative to the axis of rotation.

14. The system as recited in claim 1, wherein the entire magnetic field is directed through the air gap between the pair of plates.

15. The system as recited in claim 1, wherein the magnetic field is directed through the air gap in a direction substantially parallel to the axis of rotation.

16. A rotary angle sensing system comprising:
    a shaft rotatable about an axis of rotation;
    a magnet encircling and mounted to the shaft for generating a magnetic field;
    a pair of plates eccentrically mounted to the shaft, wherein each of the pair of plates is attached at distal ends of the magnet for directing the magnetic field, wherein an air gap is defined between the pair of plates;
    a first sensing device; and
    a second sensing device, werein the first sensing device and the second sensing device are positioned in the air gap between the pair of plates for detecting the magnetic field directed through the air gap defined between the pair of plates, wherein the first sensing device is located at a first position between the pair of plates and the second sensing device is located at a second position between the pair of plates, wherein the first sensing device generates a first signal and the second sensing device generates a second signal, wherein a relationship between the first signal and the second signal is indicative of an angular position of the shaft.

17. The rotary sensing system as recited in claim 16, further including at least one additional sensing device to improve system sensing accuracy.

18. A rotary angle sensing system comprising:
    a shaft;
    a magnet positioned near the shaft for generating a magnetic field;
    a pair of plates eccentrically mounted to the shaft, wherein each of the pair of plates is disposed proximate to opposing distal ends of the magnet for directing the magnetic field;
    a first sensing device and a second sensing device, wherein the first sensing device is located at a first position between the pair of plates and the second sensing device is located at a second position between the pair of plates, wherein the first sensing device generates a first signal and the second sensing device generates a second signal, wherein a relationship between the first signal and the second signal is indicative of an angular position of the shaft; and a third sensing device that is redundant to the first sensing device and the second sensing device in case either one of the first sensing device and the second sensing device fails.

* * * * *